United States Patent
Thompson et al.

[19]

[11] Patent Number: 6,155,341
[45] Date of Patent: Dec. 5, 2000

[54] CONTINUOUS FAN ADJUSTMENT METHOD

[75] Inventors: Kevin D. Thompson, Indianapolis; Daniel J. Dempsey, Carmel; William F. Van Ostrand, Indianapolis, all of Ind.

[73] Assignee: Carrier Corporation, Farmington, Conn.

[21] Appl. No.: 09/208,502

[22] Filed: Dec. 9, 1998

[51] Int. Cl.[7] ....................................................... F24F 11/04
[52] U.S. Cl. ...................... 165/244; 165/265; 236/91 D; 236/91 G; 236/94; 236/DIG. 9
[58] Field of Search .................................. 165/244, 245, 165/265; 110/192, 193; 62/255; 236/49.1, 49.3, 91 R, 91 D, 91 G, 94, DIG. 9

[56] References Cited

U.S. PATENT DOCUMENTS

| | | | |
|---|---|---|---|
| 4,146,086 | 3/1979 | Hobbick et al. | |
| 4,486,837 | 12/1984 | Kojima et al. | 236/91 D X |
| 4,534,406 | 8/1985 | Newell, III et al. | 165/265 X |
| 5,197,667 | 3/1993 | Bowsky et al. | 236/DIG. 9 X |
| 5,511,724 | 4/1996 | Freiberger et al. | 165/244 X |
| 5,983,146 | 11/1999 | Sarbach | 236/91 D X |
| 5,984,003 | 11/1999 | Butler | 165/245 |

FOREIGN PATENT DOCUMENTS

52-28152  3/1977  Japan .............................. 236/DIG. 9

*Primary Examiner*—Ira S. Lazarus
*Assistant Examiner*—Ljiljana V. Ciric
*Attorney, Agent, or Firm*—Wall Marjama & Bilinski

[57] ABSTRACT

A method for adjusting the continuous speed of the blower of a heating and/or cooling system of the type including a thermostat having a mode selector switch which has at least one heating position, a cooling position, and an off position, a fan switch having an on position or state and an auto position or state, and a programmable control device responsive to the thermostat for generating speed select signals for use in setting the speed of the blower motor. The programmable control device is programmed or reprogrammed so that, when the mode selector switch is in its off position or when there is no call for heating or cooling at the thermostat, time dependent movements of the fan switch away from and back to its on position are recognized as requests for changes in the continuous speed of the blower motor. The programmable control device is further programmed or reprogrammed to change the blower speed from one value to the next adjacent value each time the programmable control device recognizes the occurrence of a request for a change in speed.

19 Claims, 5 Drawing Sheets

| UNIT NO. (IMOD) | CONTINUOUS FAN SELECTION CFM (FS) | | | | | | | |
|---|---|---|---|---|---|---|---|---|
| | 0 | 1 | 2 | 3 | 4 | 5 | 6 | 7 |
| 1 | 565 | 600 | 800 | 1000 | 1200 | 1400 | 1400 | 1400 |
| 2 | 515 | 600 | 800 | 1000 | 1200 | 1400 | 1400 | 1400 |
| 3 | 690 | 600 | 800 | 1000 | 1200 | 1400 | 1400 | 1400 |
| 4 | 690 | 800 | 800 | 1000 | 1200 | 1400 | 1600 | 2000 |
| 5 | 860 | 800 | 800 | 1000 | 1200 | 1400 | 1600 | 2000 |
| 6 | 1035 | 800 | 800 | 1000 | 1200 | 1400 | 1600 | 2000 |

FIG.4A

CONTINUOUS FAN ADJUSTMENT METHOD

BACKGROUND OF THE INVENTION

The present invention relates to heating, ventilating, or air conditioning (HVAC) systems, and is directed more particularly to a method for adjusting the continuous fan speed of a HVAC system that uses a standard thermostat.

HVAC systems typically include both a heating apparatus, such as a hot air furnace, and a cooling apparatus, such as an air conditioner, although a heat pump may be used to provide one or both heating and cooling. HVAC systems also include a multi-speed blower for circulating air across the heating and cooling apparatuses to the enclosure to be heated or cooled. The operation of the HVAC system as a whole is controlled by a combination furnace or fan control, which typically comprises a programmable control unit having a stored program. In the course of controlling the heating and cooling apparatuses, this control unit turns the blower on and off and generates signals which cause the blower to run at a speed that is determined by its stored program and by the settings which a user has made at his thermostat.

A typical standard thermostat includes two manually operable switches, a mode selector switch and a fan switch. The mode selector switch is a three position switch which includes a "heat" setting that causes the HVAC to operate at its heating speed, a "cool" setting which causes the HVAC to operate at its cooling speed, and an "off" setting. The fan switch is a two position switch which includes a "fan on" setting and an "auto" setting. When the fan switch is in its "fan on" position, the blower runs continuously, and provides ventilation to the enclosure. When the fan switch is in its "auto" position, the blower runs only when there is a "call for heating" or "call for cooling", and runs at one of the speeds called for by the control unit. The number of such speeds may be as few as two, one for heating and one for cooling, or as many as six, depending on the model of the HVAC system that is used.

Prior to the present invention, the speed at which the blower operated when the fan switch was in its "fan on" position was either the heating or cooling speed and could be changed at the control unit, but not at the thermostat. This is because the fan switch of a standard thermostat is connected to the control unit by only a single output wire, and could therefore only apply or not apply a current thereto. One way of allowing a user to adjust the continuous speed of the fan or blower at the thermostat is described in U.S. Pat. No. 4,146,086 (Hobbick et al), which is assigned to the same assignee as the present invention. While the thermostat described in the latter patent allows a user to adjust the continuous fan speed at the thermostat, it has the disadvantage that it requires the use of a non-standard thermostat which includes a three position fan switch and an additional wire for selecting the desired additional continuous fan speed. Since the inclusion of an additional wire is impractical in HVAC systems that have already been installed, thermostats of the latter type could only be installed in structures at the time of their construction.

In view of the foregoing, it will be seen that, prior to the present invention, there has existed a need for a method for adjusting the continuous fan speed of HVAC systems that are equipped only with standard thermostats.

SUMMARY OF THE INVENTION

In accordance with the present invention there is provided a method for adjusting the continuous fan speed of HVAC systems which are equipped with standard thermostats.

Generally speaking, the method of the present invention comprises programming (or re-programming) the control unit of the combination furnace or fan control to look for movements of the fan switch from its "fan on" position or state to (or at least part of the way to) its "auto" position or state, and back again, i.e., the toggling of the fan switch, and to interpret those togglings as requests that the speed of the blower be incremented to the next available speed. In HVAC systems which have only a heating speed and a cooling speed, the first such toggling will cause the blower to switch from its default speed, usually its heating speed, to its cooling speed. Further togglings will then cause the blower speed to switch back to its heating speed, then back to its cooling speed, and so on upon alternate togglings of the fan switch. In HVAC systems which have two or more heating speeds and a cooling speed, the default speed may be the low heat speed, with each toggling of the fan switch being interpreted as a request for an additional speed change and causing the blower speed to be incremented to the next higher speed before reaching its maximum speed and returning back to its default value. More generally, the method of the invention may be used in any multi-speed system having any number of speeds which are given by a look-up table that can be addressed by means of requests which are made by moving the fan switch of a standard thermostat away from and back to its "on" position or state.

In accordance with one important feature of the present invention, fan switch movements that comprise requests for changes in continuous fan speed are distinguished from fan switch movements that do not comprise such requests by requiring that the movement of the fan switch from and back to its "on" position occur within a time window having a predetermined duration, such as from one to three seconds. The use of this time window is advantageous because it assures that the fan switch can be used in the usual way during those times when it is not being used to request changes in continuous fan speed.

In accordance with another important feature of the present invention, changes in fan speed, once made, remain in effect until changed again, but affect the speed of the blower when only the fan switch is in its "on" position. More particularly, blower speed adjustments made in accordance with the invention have no effect on the blower speeds that are established during heating and cooling, and changes in speed that are associated with operation of the HVAC system in its heating and cooling modes have no effect on the continuous fan speed selected at the time of its last adjustment. Thus, the use of the method of the invention increases the number of continuous fan speeds of an HVAC system without otherwise affecting the normal operation thereof.

In the preferred embodiments of the invention, the combination furnace or fan control is arranged so that continuous fan speed may be adjusted when the mode control switch is in any of its "heat, "cool" or "off" positions. When the mode control switch is in the "heat" or "cool" positions the combination furnace or fan control is arranged so that continuous fan speed can still be adjusted, provided that no call for heating or cooling is in effect while the adjustment is being made. It will be understood that all such embodiments, and equivalents thereof that would be apparent to those skilled in the art, are within the contemplation of the present invention.

BRIEF DESCRIPTION OF THE DRAWINGS

Other objects, features and advantages of the present invention will become apparent from the following description and drawings, in which.

DESCRIPTION OF THE INVENTION

Figure 1:
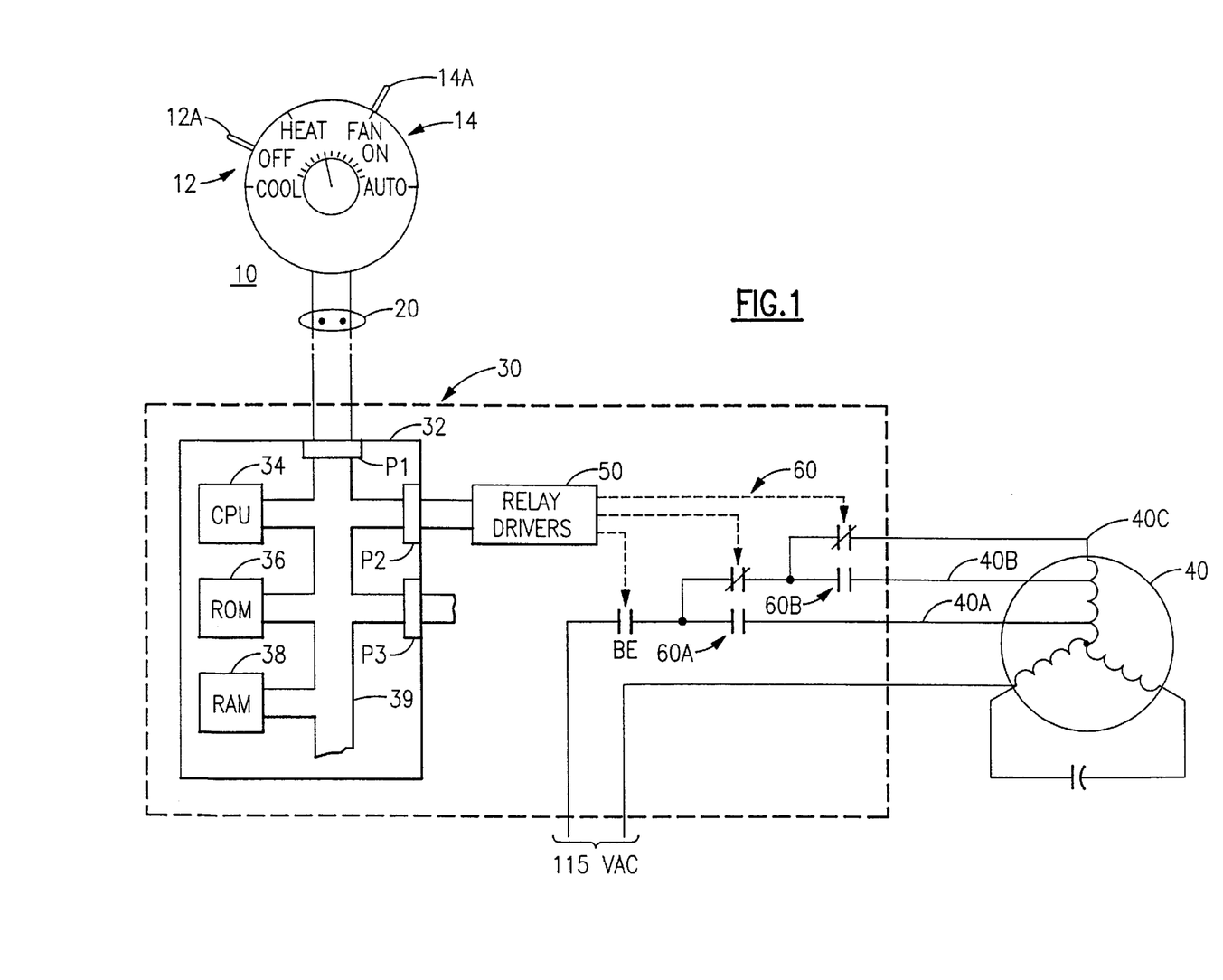
FIG. 1 is a block-wiring diagram of one embodiment of an apparatus suitable for practicing the method of the invention.

Referring to FIG. 1 there is shown a block-wiring diagram of that portion of an exemplary HVAC system which is directly involved in practicing the method of the invention. The remainder of the HVAC system, i.e., those portions thereof which do not directly relate to the practice of the present invention, such as the heating and cooling units and their associated valves, ducts, etc., have been omitted for the sake of clarity.

The portion of the HVAC system shown in FIG. 1 includes a thermostat 10 which is connected through a conventional set of wires 20 to the combination furnace or fan control unit 30 of an HVAC system. Thermostat 10 is of a conventional type and includes a multi-position mode control switch 12 (the contacts of which are not visible in FIG. 1) having a operating lever 12A that allows a user to select operation in a heating mode ("heat"), a cooling mode ("cool") or an "off" mode. Thermostat 10 also includes a two position fan switch 14 having an operating lever 14A that allows a user to switch the blower between operation in a continuous fan mode ("fan on") to an intermittent or on/off mode ("auto"). Because thermostats of the subject type are well known, the operation thereof will not be discussed in detail herein.

While the words "fan on" and "auto" both appear on the face of the thermostat, the states that they represent are not independent of one another from an electrical standpoint. This is because what the "auto" state actually indicates is the absence of the "fan on" state. In other words, the "auto" state is established as soon as the electrical signal associated with the "fan on" state is terminated, whether or not lever 14A is moved all the way to the position marked "auto". It will therefore be understood that the words and phrases "auto", "continuous fan off", and terms of similar meaning are equivalent to and interchangeable with one another, and that references to the "auto" position or state encompass any fan switch position or state in which continuous fan operation is not called for. It will also be understood that, while the following description is framed in terms of movements of the fan switch from and back to the "fan on" or "on" position or state, movements of the fan switch from and back to the "auto" position or state can also be used, and that such movements are equivalent for purposes of the present invention Control unit 30, which may be located at a considerable distance from thermostat 10, is connected in speed control relationship to a blower motor 40 through a suitable relay driver circuit 50 and its associated sets of contacts, here indicated by the collective designation 60. In response to signals received from thermostat 10, combination furnace or fan control unit 30 generates speed select signals which, by actuating appropriate combinations of the contacts of contact set 60, cause blower motor 40 to drive a blower fan (not shown) at the desired speed, and thereby establish the desired rate of airflow across the HVAC system to the enclosure to be heated or cooled.

The number of different possible speeds for blower motor 40 and, consequently, the number of different rates of airflow across the HVAC system to the enclosure is usually dependent on the way in which one or more of the windings of motor 40 are wound. In FIG. 1 these different speeds are established by providing the blower winding with a plurality of taps, such as 40A, 40B and 40C that connect to different respective numbers of turns, and selectably applying drive power to the tap that is associated with the desired speed. The number of such speeds will vary from furnace type to furnace type and from application to application, and may be as few as two or as many as five or even more. As will be explained more fully later, the method of the invention may be used with any system which has two or more speeds.

Combination furnace or fan control unit 30 may employ a single chip integrated circuit microcontroller or microprocessor 32 which is of a conventional type. Microcontroller 32, for example, includes a central processor (CPU) 34, a read only memory (ROM) 36 for storing a heating and/or cooling control program for the HVAC system as a whole, and a read-write memory (RAM) 38 for storing changeable information such as fault codes, low heat on time, high heat on time, continuous fan speed and any other control related data. Tables, including look up tables that define permitted operating states for the HVAC system, may be stored in ROM 36 or RAM 38 or both. CPU 34, ROM 36 and RAM 38 are preferably connected to one another and to the I/O ports of microcontroller 32 via a suitable data and control bus 39. Because the operation of microcontrollers is well known to those skilled in the art, the internal operation of microcontroller 32 will be discussed herein only to the extent necessary to distinguish its stored program from those of HVAC systems of types that are known in the art.

Prior to the present invention, the stored program of a combination furnace or fan control unit such as control unit 30 of FIG. 1 was designed to receive data from an associated thermostat on what may be thought of as a time independent or time insensitive basis. By this it is meant that the control unit was programmed to place significance on voltage or current levels, and on transitions between such voltage or current levels, but not to place significance on the temporal relationships between transitions between such levels. As a result, the amount of information that the controller could receive from the associated thermostat was, at most, equal to the number of conductors that connected the controller to the thermostat.

In accordance with the present invention the combination furnace or fan control unit of an otherwise conventional HVAC system is programmed (or reprogrammed) to respond to data from an associated thermostat on a time dependent or time sensitive basis, thereby increasing the amount of user entered information which it can receive from the associated thermostat without increasing the number of conductors that connect it to that thermostat. More particularly, a control unit constructed in accordance with the invention is programmed (or reprogrammed) to respond not only to the "on" and "auto" states of fan switch 14, but also to detect and respond to the occurrence of predetermined temporal relationships between transitions among these states. The control unit is also programmed to interpret the occurrence of these temporal relationships as user initiated requests for changes in the continuous fan speed, and to change the latter speed in a manner that is consistent with the number of different speeds at which the HVAC system is able to operate. It will therefore be seen that an HVAC system which is equipped with a control unit that is programmed in accordance with the method of the invention allows a user to change the continuous fan speed of his system at will, without having to change either his thermostat or the number of conductors which connect that thermostat to the remainder of the HVAC system or electrically switch the associated speed taps from motor 40.

Figure 2:
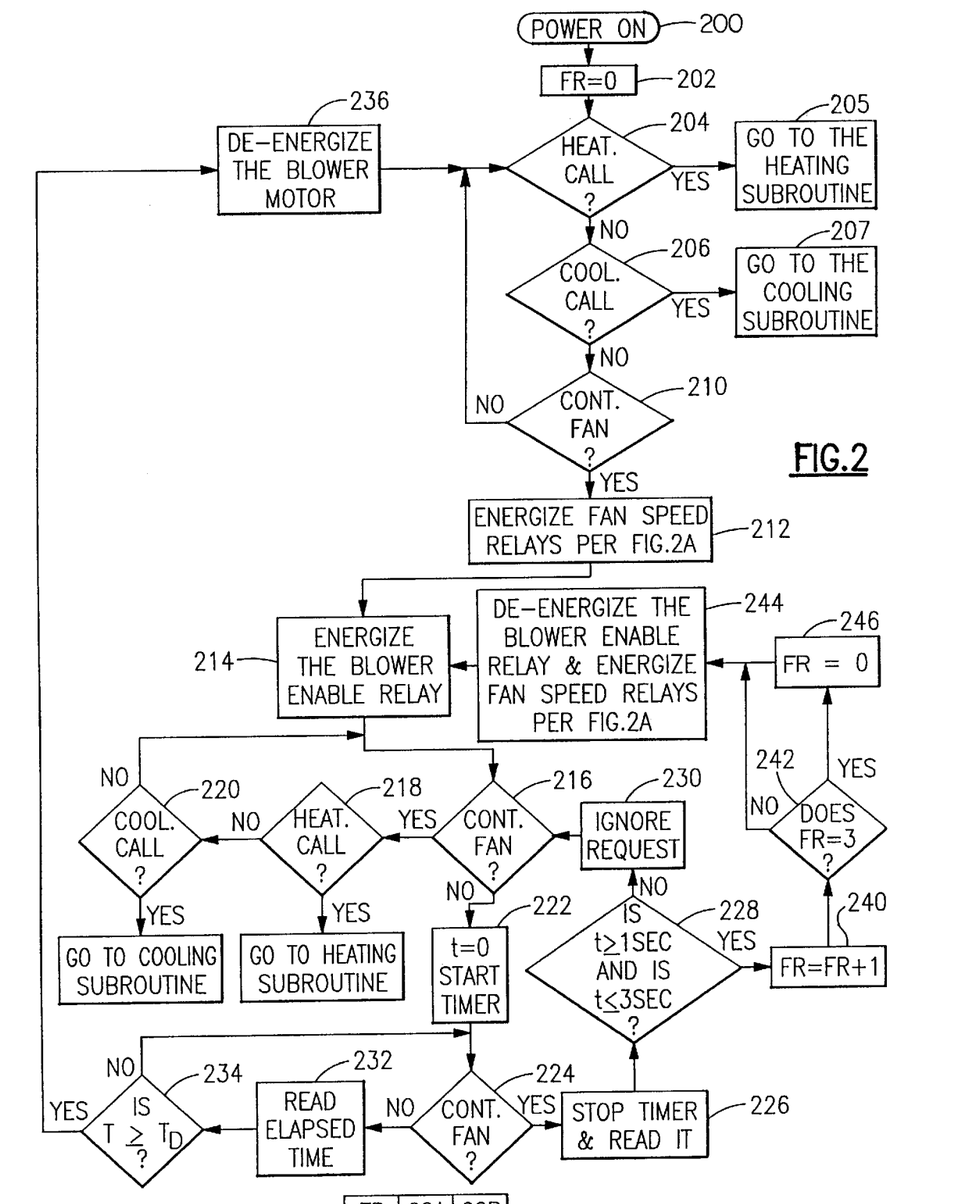
FIG. 2 is a flow chart showing the application of the method of the invention to an HVAC system that includes a two stage furnace with a PSC blower.
Figure 3:
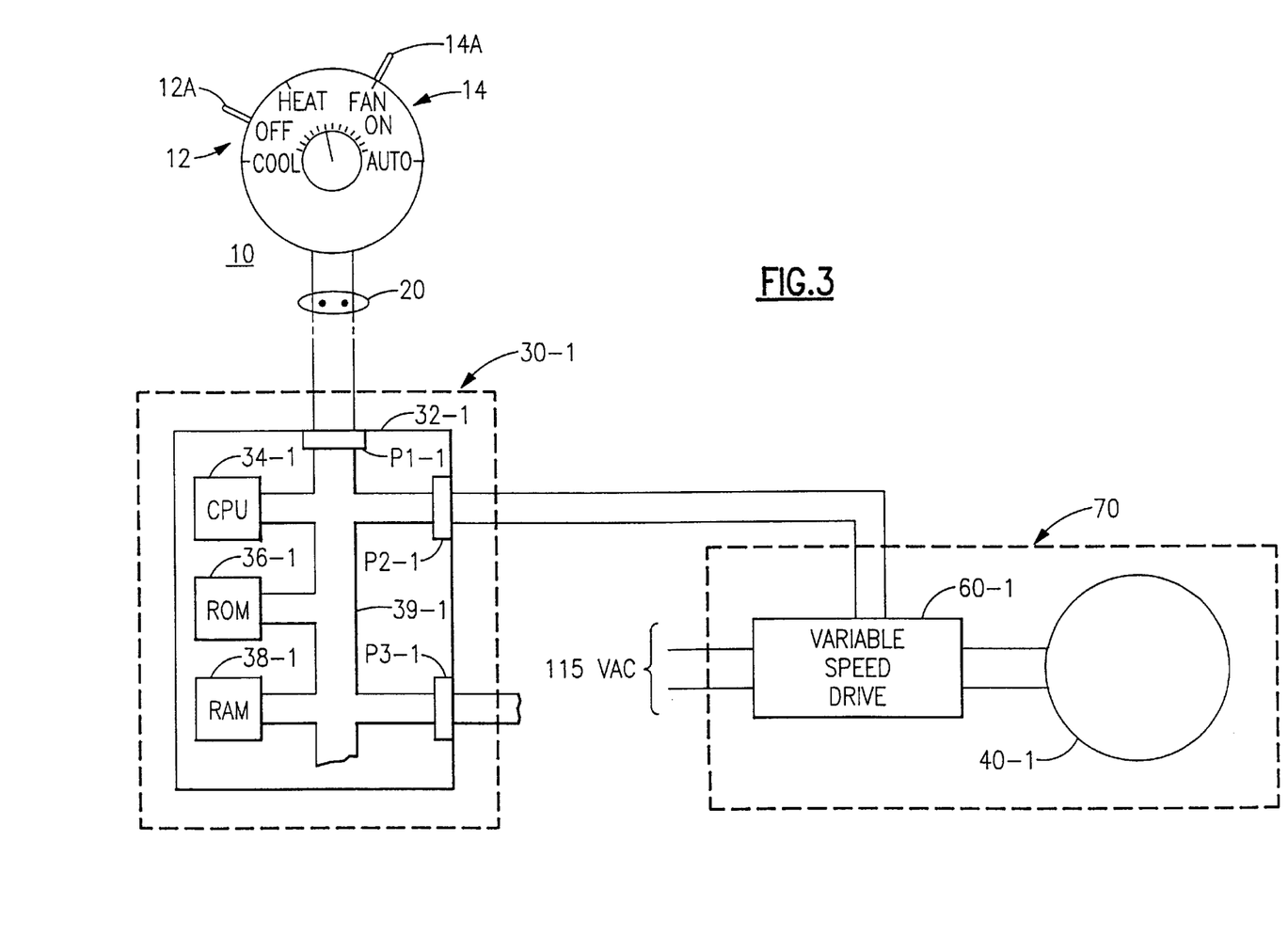
FIG. 3 is a block diagram of a second embodiment of an apparatus suitable for use in practicing the method of the invention.

Examples of how the method of the invention may be applied to afford user selectable control over the continuous fan speed of HVAC systems having two or more speeds will now be discussed with reference to the flow charts of FIGS. 2 and 3 and their associated tables of speeds and states. Of these, the flow chart of FIG. 2 shows the application of the invention to an HVAC system having a single or two stage furnace with a PSC blower, and FIG. 3 shows the application of the invention to an HVAC system having a furnace with a variable speed blower. As will be explained more fully later, the embodiment of FIG. 2 is an embodiment in which the continuous fan speed can be adjusted even when mode selector switch 12 is not in its "off" position.

Figure 2A:
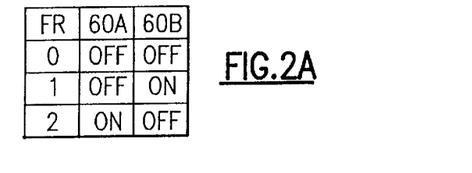
FIG. 2A is a table which shows the states that characterize the operation of a furnace controlled in accordance with the flow chart of FIG. 2.

Referring first to the embodiment of FIGS. 2 and 2A, operation begins as the system is first powered up (block 200) and a working or loop control variable FR is initialized to a value of 0. After this occurs, control unit 30 tests for the presence of a call for heating (block 204) or cooling (block 206) and, if such a call is present, is directed to a heating subroutine 205 or a cooling subroutine 207 to service that call. If neither call is present, control passes to block 210, and enters the portion of the flow chart that is associated with the adjustment of continuous fan speed according to the invention. Because the servicing of calls for heating or cooling is accomplished in a manner known to those skilled in the art, the servicing of these calls will not be discussed in detail herein.

It will be observed that, if neither a call for heating nor a call for cooling is present in the embodiment of FIG. 2, it does not matter whether this is true because mode switch 12 is in its "off" position, or because mode switch 12 is in its "heat" or "cool" position and the temperature of the enclosure is within acceptable limits. These alternative ways of reaching block 210 provide the basis for two different embodiments of the invention. In the preferred embodiment, shown in FIG. 2, the control unit will advance to block 210 without regard to which of the above mentioned alternatives applies.

If, on encountering block 210, the control unit finds that fan switch 14 is not in its "on" or continuous fan position, it loops back to blocks 204 and 206 to test for the presence of newly occurring calls for heating or cooling, and then forward to block 210 to test for a newly occurring call for continuous fan operation. The control unit may cycle through the loop including blocks 204, 206 and 210 many times until it finds that fan switch 14 is in its "on" position and is allowed to advance to blocks 212 and 214. On encountering blocks 212 and 214, the control unit is directed to establish the combination of relay states called for by then current value of control variable FR (block 212), in this case 0, and energize blower enable relay BE of FIG. 1 (block 214). As shown in the table of FIG. 2A, the combination of relay states that corresponds to FR=0 is one that leaves the contacts 60A and 60B of contact set 60 in their unenergized (normally closed) states. As a result, power will be supplied to tap 40C of blower 40, causing the latter to operate at its lowest speed. Thus, under the assumed starting condition, the continuous operating speed of the fan will be equal to its default speed, or lowest operating speed. In two stage systems this is low heat speed.

After the above-described condition has been established, the combination furnace or fan control unit is directed to block 216, which causes it to again determine whether the fan switch is in its "on" position. If it is, the control unit tests for the presence of a call for heating or cooling (blocks 218 and 220) and, if either is present, is directed to service that call. If, however, the control unit finds that the fan switch is in its "auto" or off state, there exists the possibility that a user is initiating a request for a change in the continuous speed of the fan. To determine whether this is the case, the controller is directed to a timing loop that includes blocks 222 through 234. In this loop the control unit starts a timer (block 222), and tests whether the fan switch is in its "on" position (block 224). If it is not, the control unit cycles through the loop including blocks 232 and 234 which together check the "off delay" time $T_D$ of the control unit, until the control unit detects that the fan switch has been returned to its "on" position or the timer exceeds $T_D$. If the timer exceeds $T_D$, the control unit is directed to block 236 where the blower is turned "off" and then proceeds back to block 204. If the timer does not exceed $T_D$, the control unit is directed back to block 224 by "off delay" blocks 232 and 234 and, if the fan switch has been returned to its "on" position, blocks 226–230 determine if the time that the fan switch was not in its "on" position was within the limits, or time window, that the control unit is programmed to interpret as a request for a change in the continuous speed of the fan.

If no request for a change is recognized, no change is made in control variable FR, and control is returned to blocks 216–220 to await the occurrence of calls for heating or cooling, or further changes in the position of the fan switch. If a request for a change is recognized, the control unit is directed to block 240, which causes variable FR to be incremented to its next higher value, in this case 1. Then, if FR has not reached its maximum value (block 242), in this case 3, the control unit is directed to block 244, which causes it to establish, in contact set 60, that combination of closed contacts which is called for by the table of FIG. 2A when FR=1. As shown in FIG. 2A, this combination is one in which the state of contacts 60A is not changed, but in which the state of contacts 60B is changed. Under these conditions, the blower enable relay BE is briefly de-energized before contacts 60B are closed. Then the blower enable relay BE is re-energized supplying AC power to tap 40B of the blower motor, causing it to run at the next available higher speed, in this case its heating speed. In two-stage systems this is high heating speed. The brief de-energizing of the blower enable relay BE is for a few milliseconds and is done to improve the reliability of relay contacts 60A and 60B and prevents multiple motor speed taps from being energized simultaneously.

If, under the above-described condition, a user were to again move the fan switch in a way that the control unit is programmed to recognize as a request for a change in continuous fan speed, the value of control variable FR would be incremented again, causing FR to reach its third and maximum value of 2. Under this condition, the control unit would establish that combination of closed contacts which is associated with FR=2 in FIG. 2A, i.e., the combination which causes AC power to be applied to tap 40A. As a result, blower motor 40 will operate at its highest speed, namely: its cooling speed.

Once the blower is operating at its highest speed, however, the movement of the fan switch to request a third, still further change in fan speed will bring blocks 242 and 246 into action, and cause variable FR to be returned to its original, default value of 0. This occurs because, when variable FR is incremented to 3, it takes on a value which is greater than the number of different speeds at which the blower motor may run (bearing in mind that FR=0 accounts for one of the three operating speeds at which the blower motor of the present example may run), and therefore meets the condition imposed by block 242. Meeting this condition, in turn, directs the control unit to block 246, which forces FR=0 and thereby causes the blower to return to its original, low speed setting. This resetting or return of the control variable to its original value after having taken on a number of values that is equal to the number of speeds at which the blower motor may run is typical of preferred embodiments of the invention. This feature, which will hereinafter sometimes be referred to as a "wrap around" feature, is included in preferred embodiments because it assures that a user can begin with whatever continuous fan speed he finds himself and change that speed to whatever fan speed he chooses by simply manipulating the fan switch through a predetermined time dependent sequence of positions.

In view of the foregoing, it will be seen that the method of the invention enables a user to cause the blower fan of an HVAC system to operate at any of the continuous speeds at which the blower motor is capable of operating, that does so in a way that does not require changes to the HVAC system other than changes in the programming of the control unit thereof, and that does not interfere with the operation of the system in its heating or cooling modes. As will be seen from the additional examples which will now be described, the method of the invention may be used with any heating and/or cooling system without regard to the number of its operating speeds, provided that the system has a blower motor that is capable of running at two or more speeds.

If the system with which the invention is to be used includes only two speeds, e.g., a heating speed and the cooling speed, it may be adapted for use with the invention by modifying the circuitry of FIG. 1 to eliminate one of the sets of relay contacts, i.e., contact set 60B, by modifying the flow chart of FIG. 2 to set the maximum value of FR equal to 2, and by modifying the look-up or state table of FIG. 2A to eliminate one of its three states. Since the operation of such a simplified system is the same as that described in connection with the embodiments of FIGS. 1 and 2, except for its smaller number of speeds, this simplified embodiment will not be shown or further described herein.

If, on the other hand, the system with which the invention is to be used includes more than three speeds, it may be adapted for use with the invention by modifying the circuitry of FIG. 1 to add one or more sets of relay contacts, by modifying the flow chart of FIG. 2 to set the maximum value of FR equal to a number greater than three, and by modifying the look-up or state table of FIG. 2 to include an increased number of states. Since the operation of this more complex system is the same as that described in connection with the embodiments of FIGS. 1 and 2, except for the larger number of speeds, this more complex system will not be shown or further described herein.

For systems that use a variable speed blower motor, the invention may be practiced using a variable speed motor control circuit which is designed to drive the motor at any one of a plurality of different electronically selectable airflows. An example of such a system will now be described with reference to FIGS. 3, 4 and 4A.

Figure 4:
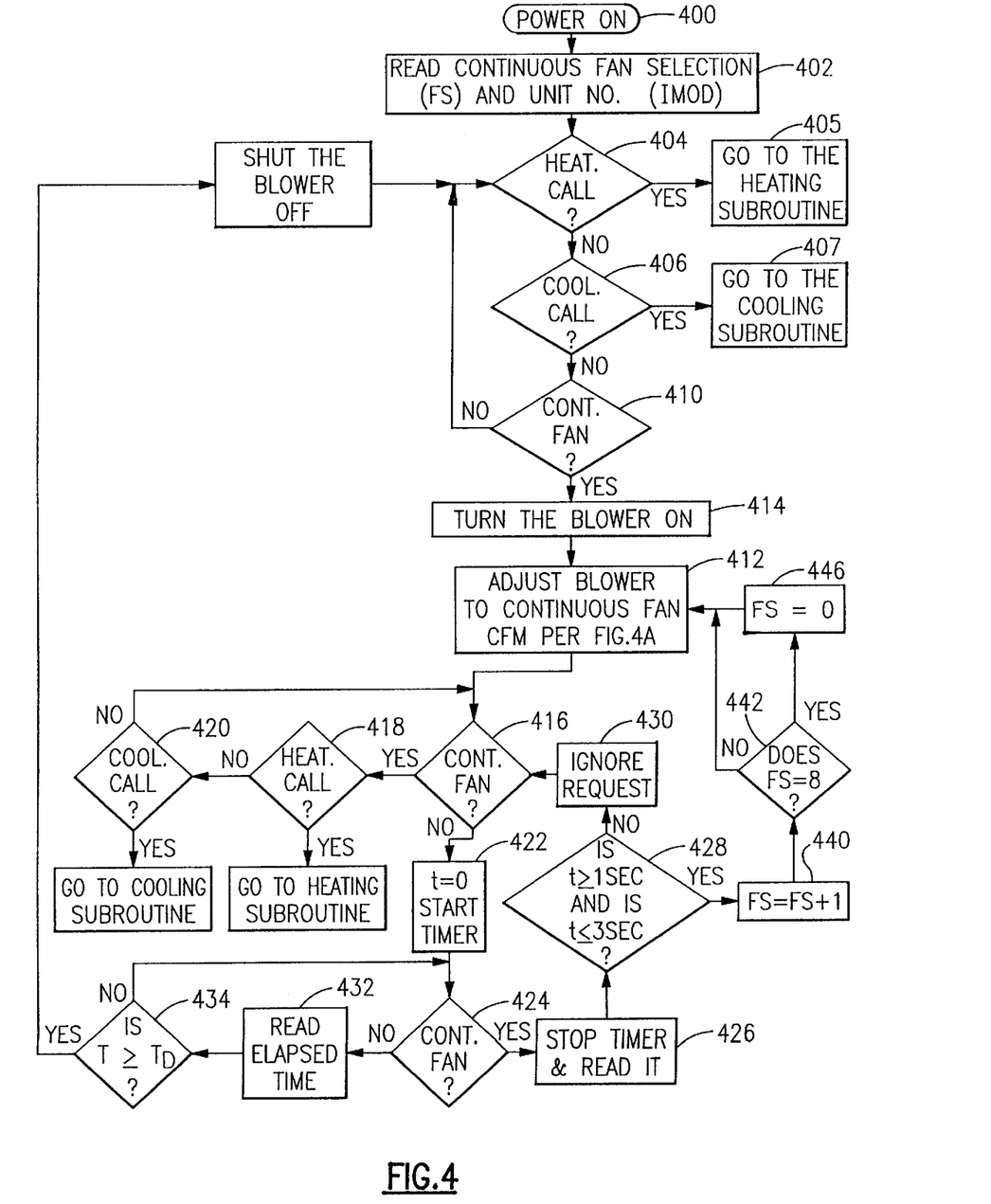
FIG. 4 is a flow chart showing the application of the method of the invention to an HVAC system that includes a furnace with a variable speed blower.
Figure 4A:
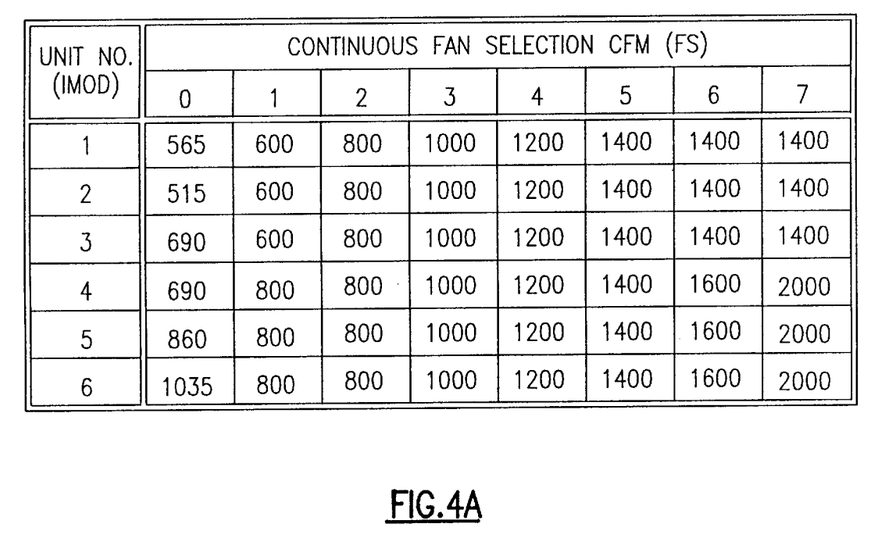
FIG. 4A is a table which shows the states that characterize the operation of various models of furnaces that may be controlled in accordance with the flow chart of FIG. 4.

Referring to FIG. 3 there is shown a block diagram of a portion of a furnace which is adapted for operation at a relatively large number of different airflows, such as eight, although there is in principle no upper limit to the number of airflows that may be provided for. Examples of the different airflows at which various models of furnaces with variable speed blowers operate are included in FIG. 4A. As in the case of FIG. 1, FIG. 3 shows only that part of the HVAC control system which relates to the practice of the present invention. The block diagram of FIG. 3 is generally similar to that of FIG. 1, corresponding parts being similarly numbered, except for the addition of the postscript "-1". A major difference is that the control system of FIG. 3 includes a variable speed blower motor drive 60-1 instead of sets of relay contacts 60. Blower 40-1 and motor drive 60-1 may be included in a single module 70 which is commonly referred to as an Integrated Control and Motor or ICM. Finally, the control system of FIG. 3 includes a control unit 30-1 which includes ROM 36-1 which has a stored program that is adapted to accommodate the greater number of airflows at which the blower motor will operate. Since, except as will be described presently in connection with the flow chart of FIG. 4, the operation of a system of the type shown in FIG. 3 is known to those skilled in the art, and it will not be described in detail herein, Referring to FIG. 4, there is shown the flow chart for a stored program of the type that is suitable for use in practicing the method of the invention with a system of the kind shown in FIG. 3. This flow chart of FIG. 4 is generally similar to that shown in FIG. 2, corresponding steps being similarly numbered, except for the fact that all numbers begin with the number 4, rather than the number 2. Because the differences between the flow charts of FIGS. 2 and 4 are so few, only the respects in which the flow chart of FIG. 4 differs from that of FIG. 2 will be specifically discussed herein.

One difference between the flow charts of FIGS. 2 and 4 is that the latter includes a block 402 which causes control unit 30-1 not merely to set the continuous fan control variable (referred to as "FS" in FIG. 4) to a suitable initial value, such as 0, that is associated with the lowest heating speed, but also to determine the model number of furnace with which it is being used. The determination of the model number of the furnace at this point is desirable because it allows control unit 30-1 to be designed so that it can be used, without change, in furnaces of a variety of different types. Consistent with this purpose, the look-up table that is used by the flow chart of FIG. 3 includes a plurality of model look-up tables, labeled 1 through 6 in FIG. 4, one for each of the different models with which controller unit 30-1 may be used.

Other differences between the flow charts of FIGS. 2 and 4 are that the flow chart of FIG. 4 does not include a block that corresponds to block 244 of FIG. 2, and includes blocks 412 and 414 that differ from the most nearly corresponding blocks, 212 and 214, of FIG. 2. The differences between these blocks reflect the fact that the system of FIG. 3 makes changes in the continuous fan airflow by making changes in the numerical value of the cfm specifying signal which it applies to variable speed drive 60-1, and not by making changes in the relay control signal which it applies to relay driver 50. Since both of these signals have the effect of changing the airflow and/or speed of the fan in accordance with speed change requests which a user makes by manipulating a thermostat fan switch, both of these two signals may properly be referred to as "speed select signals".

Except for the above-mentioned differences, and the different numbers of speeds which they can handle, the programs represented in the flow charts of FIGS. 2 and 4 operate in the same way to increment their respective control variables each time that a user manipulates his fan switch in the manner which his controller is programmed to recognize as a speed change request. As these requests are recognized, the control variable causes the speed select signal to change from its current value to the next adjacent value, then the next, and so on, until it has cycled through all of the available values and returns to its original value in accordance with the earlier described wrap-around feature. Because of this similarity of operation, the flow chart of FIG. 4 will not be further described herein.

While the present invention has been described with reference to a number of particular embodiments, it will be understood that the true spirit and scope of the invention should be determined with reference to the appended claims.

What is claimed is:

1. A method for use with a heating and/or cooling system including a blower fan, a blower motor for driving said blower fan, said blower motor having at least one heating speed and a cooling speed, a thermostat having a mode selector switch which has a heating position associated with a call for heating, a cooling position associated with a call for cooling, and an off position, said thermostat also having a fan switch that has a "fan on" position associated with running said blower fan at a continuous fan speed and an auto position associated with running said blower fan at one of said at least one heating speed and cooling speed, and a controller connected to said thermostat for generating a speed select signal for use in setting the speed of said blower motor, comprising:

providing said controller with a stored program that:
   (a) when there is no call for heating or cooling at said thermostat, causes said controller to recognize predetermined changes in the position of said fan switch as requests for changes in said continuous fan speed;
   (b) defines a plurality of different values for said speed select signal, said different values corresponding to different respective ones of said at least one heating speed and cooling speed; and
   (c) responds to said requests by changing the speed select signal which is generated when said fan switch is in said "fan on" position, thereby changing said continuous fan speed.

2. The method of claim 1 in which a request is made by moving said fan switch from and back to said "fan on" position.

3. The method of claim 1 in which a request is made by moving said fan switch away from and back to said fan on position within a predetermined amount of time.

4. The method of claim 1 in which said plurality of different values are established with reference to a look up table having a plurality of entries which correspond to said at least one heating speed and cooling speed, and in which said requests result in changes in the entries that are used in establishing said continuous fan speed.

5. The method of claim 1 in which said speed select signal has a default value that corresponds to one of said at least one heating speed and cooling speed, and at least one other independent speed.

6. The method of claim 1 in which said plurality of different values includes at least a lowest value and a highest value, and in which said controller is programmed to switch between said lowest and highest values, if said speed select signal has one of said highest and lowest values, respectively, when a request for a change in said continuous fan speed is recognized.

7. The method of claim 1 in which said speed select signal has at least two values, and is changed from a current value to the next larger or smaller value when a request for a change in said continuous fan speed is recognized.

8. The method of claim 1 in which changes in the speed select signals which are generated when the fan switch is in its "fan on" position do not change the speed select signals which are generated when said fan switch is in its auto position.

9. A method for use with a heating and/or cooling system including a blower fan, a blower motor for driving said blower fan, said blower motor having at least one heating speed and a cooling speed, a thermostat having a mode selector switch which has a heating position associated with a call for heating, a cooling position associated with a call for cooling, and an off position, said thermostat also having a fan switch that has a "fan on" position associated with running said blower fan at a continuous fan speed and an auto position associated with running said blower fan at one of said at least one heating speed and cooling speed, and a controller responsive to said thermostat for generating a speed select signal for use in setting the speed of said blower motor, comprising:

programming of said controller to:
   (a) define a plurality of different values for said speed select signal;
   (b) define an occurrence of a request for a change in said continuous fan speed as predetermined time dependent changes in the position of said fan switch;
   (c) sample the position of said fan switch to detect the occurrence of a request for a change in said continuous fan speed; and
   (d) change the value of the speed select signal which is generated when said fan switch is in its "fan on" position, if a request for a change in said continuous fan speed is detected.

10. The method of claim 9 further comprising the programming of said controller to act on a request for a change in said continuous fan speed when said mode control switch is in said off position, or when said mode control switch is not in said off position and there is neither a call for heating nor a call for cooling.

11. The method of claim 9 in which a user enters a request for a change in said continuous fan speed by changing the state of said fan switch away from and back to said "fan on" state within a predetermined amount of time.

12. The method of claim 9 in which said speed select signal has a default value that corresponds to one of said at least one heating speed and cooling speed, and at least one other independent speed.

13. The method of claim 9 in which different ones of said speed select signal values are established with reference to a look up table having a plurality of addresses, and in which detection of a request for a change in said continuous fan speed results in a change in the address at which said look up table is addressed.

14. The method of claim 9 in which said speed select signal has a plurality of different values including at least a lowest value and a highest value, and in which said controller is arranged to switch between said highest and lowest values if said speed select signal has one of said lowest and highest values, respectively, when a request for a change in said continuous fan speed is detected.

15. The method of claim 9 in which said speed select signal has at least two values, and is changed from a current value to the next larger or smaller value when a request for a change in said continuous fan speed is detected.

16. The method of claim 9 in which changes in the speed select signals which are generated when the fan switch is in its "fan on" position do not change the speed select signals which are generated when said fan switch is in its auto position.

17. A method for use with a heating and/or cooling system including a blower fan, a blower motor for driving said blower fan, said blower motor having at least one heating speed and a cooling speed, a thermostat having a mode selector switch which has a heating position associated with a call for heating, a cooling position associated with a call for cooling, and an off position, said thermostat also having a fan switch that has a "fan on" position associated with running said blower fan at a continuous fan speed and an auto position associated with running said blower fan at one of said at least one heating speed and cooling speed, a plurality of fan speed relays for controllably causing said blower motor to operate at one of said at least one heating speed and cooling speed, and a controller connected to said thermostat for generating a speed select signal that specifies which of said fan speed relays are to be actuated and thereby setting the speed of said blower motor, said method comprising:

providing said controller with a stored program that:
 (a) when there is no call for heating or cooling at said thermostat, causes said controller to recognize predetermined changes in the position of said fan switch as a request for a change in said continuous fan speed;
 (b) defines a plurality of different values for said speed select signal, and
 (c) responds to a request for a change in said continuous fan speed by changing the value of the speed select signal which is generated when said fan switch is in said "fan on" position.

18. The method of claim 17 in which changes in the speed select signals which are generated when the fan switch is in its "fan on" position do not change the speed select signals which are generated when said fan switch is in its auto position.

19. A method for use with a heating and/or cooling system including a blower fan, a blower motor for driving said blower fan, said blower motor being adapted to operate at any of a plurality of different speeds to establish a corresponding number of different blower airflow values, a thermostat having a mode selector switch which has a heating position associated with a call for heating, a cooling position associated with a call for cooling, and an off position said thermostat also having a fan switch that has a "fan on" position associated with running said blower fan at a continuous fan speed and an auto position associated with running said blower fan at one of said plurality of different speeds, and a controller responsive to said thermostat for generating a speed select signal that specifies the blower airflow value to be established by said blower motor, said method comprising:

programming of said controller to:
 (a) define a plurality of different values for said speed select signal;
 (b) define a speed change request as predetermined time dependent changes in the position of said fan switch,
 (c) sample the position of said fan switch to detect the occurrence of a speed change request; and
 (d) change the value of said speed select signal, if a speed change request is detected, and thereby cause said continuous fan seed to assume a new value equal to one of said plurality of different speeds.

* * * * *